US008627935B2

(12) United States Patent
Danciu et al.

(10) Patent No.: US 8,627,935 B2
(45) Date of Patent: Jan. 14, 2014

(54) CLUTCH FOR SELECTIVELY DRIVING AN ACCESSORY

(71) Applicant: Litens Automotive Partnership, Woodbridge (CA)

(72) Inventors: John Danciu, Maple (CA); Jacek Stepniak, Innisfil (CA); Flaviu V. Dinca, Richmond Hill (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 13/711,806

(22) Filed: Dec. 12, 2012

(65) Prior Publication Data
US 2013/0098730 A1 Apr. 25, 2013

Related U.S. Application Data

(63) Continuation of application No. PCT/CA2011/000701, filed on Jun. 15, 2011.

(60) Provisional application No. 61/355,325, filed on Jun. 16, 2010.

(51) Int. Cl.
*F16D 27/105* (2006.01)
*F16D 13/08* (2006.01)

(52) U.S. Cl.
USPC .................... 192/35; 192/81 C; 192/84.81

(58) Field of Classification Search
USPC ............................................... 192/84.81
See application file for complete search history.

(56) References Cited

U.S. PATENT DOCUMENTS

| 2,523,772 A | * | 9/1950 | McGibbon et al. | 192/35 |
| 3,006,448 A | * | 10/1961 | Fox | 192/81 C |
| 3,637,056 A | * | 1/1972 | Baer | 192/12 BA |
| 4,825,988 A |  | 5/1989 | Nishimura | |
| 5,031,744 A |  | 7/1991 | Nishimura | |
| 5,314,053 A |  | 5/1994 | Nishimura | |
| 2008/0184945 A1 |  | 8/2008 | Guala et al. | |
| 2009/0298646 A1 | * | 12/2009 | Parsons | 477/167 |

(Continued)

FOREIGN PATENT DOCUMENTS

| DE | 10013252 A1 | 10/2001 |
| GB | 2391048 A | 1/2004 |

(Continued)

OTHER PUBLICATIONS

Written Opinion mailed Sep. 15, 2011, for corresponding International Application No. PCT/CA2011/000701.

*Primary Examiner* — Richard M. Lorence
(74) *Attorney, Agent, or Firm* — Harness, Dickey & Pierce, P.L.C.

(57) ABSTRACT

A clutch assembly having a driver, an output member, a clutch spring, an armature and an actuator. The clutch spring includes a plurality of coils that are configured to be drivingly engaged with the driver. The clutch spring further includes first and second ends. The first end is configured to drivingly engage the output member to facilitate the transmission of rotary power from the driver, through the clutch spring and into the output member. The second end is engaged to the armature. The actuator is selectively operable for rotating the armature relative to the driver in a rotational direction opposite a predetermined rotational direction in which the driver is driven to thereby initiate at least partial disengagement of the coils of the clutch spring from the driver.

23 Claims, 6 Drawing Sheets

(56) References Cited

U.S. PATENT DOCUMENTS

| | | |
|---|---|---|
| 2010/0230227 A1 | 9/2010 | Parsons et al. |
| 2012/0055436 A1 | 3/2012 | Antchak et al. |
| 2012/0133465 A1 | 5/2012 | Staniewicz et al. |

FOREIGN PATENT DOCUMENTS

| | | |
|---|---|---|
| WO | WO-2005028901 A1 | 3/2005 |
| WO | WO-2009136255 A1 | 11/2009 |
| WO | WO-2010054487 A1 | 5/2010 |
| WO | WO-2011078508 A2 | 6/2011 |
| WO | WO-2011156902 A1 | 12/2011 |
| WO | WO-2011156917 A2 | 12/2011 |
| WO | WO-2012000089 A1 | 1/2012 |
| WO | WO-2012024790 A2 | 3/2012 |
| WO | WO-2012037655 A1 | 3/2012 |
| WO | WO-2012045151 A1 | 4/2012 |
| WO | WO-2012079155 A1 | 6/2012 |
| WO | WO-2012135942 A1 | 10/2012 |
| WO | WO-2013003950 A1 | 1/2013 |

\* cited by examiner

CLUTCH FOR SELECTIVELY DRIVING AN ACCESSORY

CROSS-REFERENCE TO RELATED APPLICATIONS

This application is a bypass continuation of PCT International Application No. PCT/CA2011/000701 filed on Jun. 15, 2011, which claims the benefit of U.S. Provisional Application No. 61/355,325, filed on Jun. 16, 2010. The entire disclosure of each of the above applications is incorporated by reference as if fully set forth in detail herein.

FIELD

The present disclosure generally relates to a clutch for selectively driving an accessory.

BACKGROUND

Many engine systems include one or more devices, typically referred to as accessories, which are operated from the engine when the engine is running. Examples of such accessories can include, without limitation, alternators, pumps (including water, air, oil, power steering, brake system and other pump units), air conditioning compressors, superchargers, cooling fans, etc.

Typically these accessories are located adjacent the engine and are directly, or indirectly (via a camshaft, counter balance shaft or idler shaft, etc.) connected to the crankshaft of the engine via a drive means such as a flexible belt, chain or a train of gears such that operation of the engine also drives the accessory through the respective drive means.

While such accessory drive systems have been used for many years, recently fuel efficiency and other concerns have made it desirable to be able to selectively drive some accessories. In other words, it has become desirable to be able to selectively apply engine generated torque to some accessories such that the accessory can be operated, or not, as desired, when the engine is operating. For example, it has become desirable, under some engine and vehicle operating conditions such as cold weather starting, to not operate the water pump for the engine cooling system until the engine has reached a pre-selected operating temperature. Once the engine has reached the pre-selected operating temperature, it is desired to apply torque from the engine to the water pump to operate the pump.

SUMMARY

This section provides a general summary of the disclosure, and is not a comprehensive disclosure of its full scope or all of its features.

In one form, the present disclosure provides a clutched apparatus that includes a driver, an output member, and a clutch spring. The driver has a cylindrical torque transfer surface and is configured to be coupled to a source of rotary power to cause the driver to be rotated in a predetermined rotational direction. The output member is capable of independent rotation relative to the driver and includes a first control member. The clutch spring is formed of wire and has coils wound in a sense that is opposite to the predetermined rotational direction of the driver. The clutch spring has a first end and a second end that is opposite the first end. The coils are engaged to the cylindrical torque transfer surface. The spring control device includes a second control member, which is coupled to the second end, and an armature. The actuator is operable in a disengaging mode and an engaging mode. A force is generated when the actuator is operated in the disengaging mode; the force is transmitted to the armature such that the armature rotates relative to the driver in a rotational direction opposite the predetermined rotational direction to apply a control signal to the second end. Rotation of the driver in the predetermined direction when the actuator is operated in the engaging mode causes the coils of the clutch spring to drivingly engage the cylindrical torque transfer surface such that rotary power is transmitted in the predetermined rotational direction between the first end and the first control member. The coils of the clutch spring at least partly release the cylindrical torque transfer surface when the driver is rotated in the predetermined rotational direction and the actuator is operated in the disengaging mode to limit transmission of rotary power in the predetermined rotational direction between the first end and the first control member.

In another form, the present disclosure provides a clutched apparatus that includes a driving member, an output member, a driver coupled to the driving member for rotation therewith, a clutch spring and an actuator. The clutch spring has a first end, a second end and a plurality of coils between the first and second ends. The first end is engaged to the output member. The coils are engage-able to a torque transfer surface to rotationally couple the output member to the drive. The actuator is configured to cause the clutched apparatus to operate in a disengaged condition. The actuator includes a coil, a return spring and an armature that is coupled to the second end of the clutch spring for rotation therewith. The return spring biases the armature in a first direction. The coil is configured to translate the armature against the bias of the return spring so that a frictional torque that resists rotation of the armature causes the coils of the clutch spring to at least partially disengage the torque transfer surface.

In a still further form, the present disclosure provides a clutched apparatus that includes a driving member, an output member, an accessory, an endless power transmitting element, and a clutch assembly. The driving member is a crankshaft, a camshaft, an idler shaft, a jack shaft or a counterbalance shaft. The accessory is an alternator, a pump, an air conditioning compressor, a supercharger or a cooling fan. The endless power transmitting element is configured to transmit power from the output member to the accessory. The clutch assembly is configured to selectively couple the driving member to the output member.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION

Figure 1:
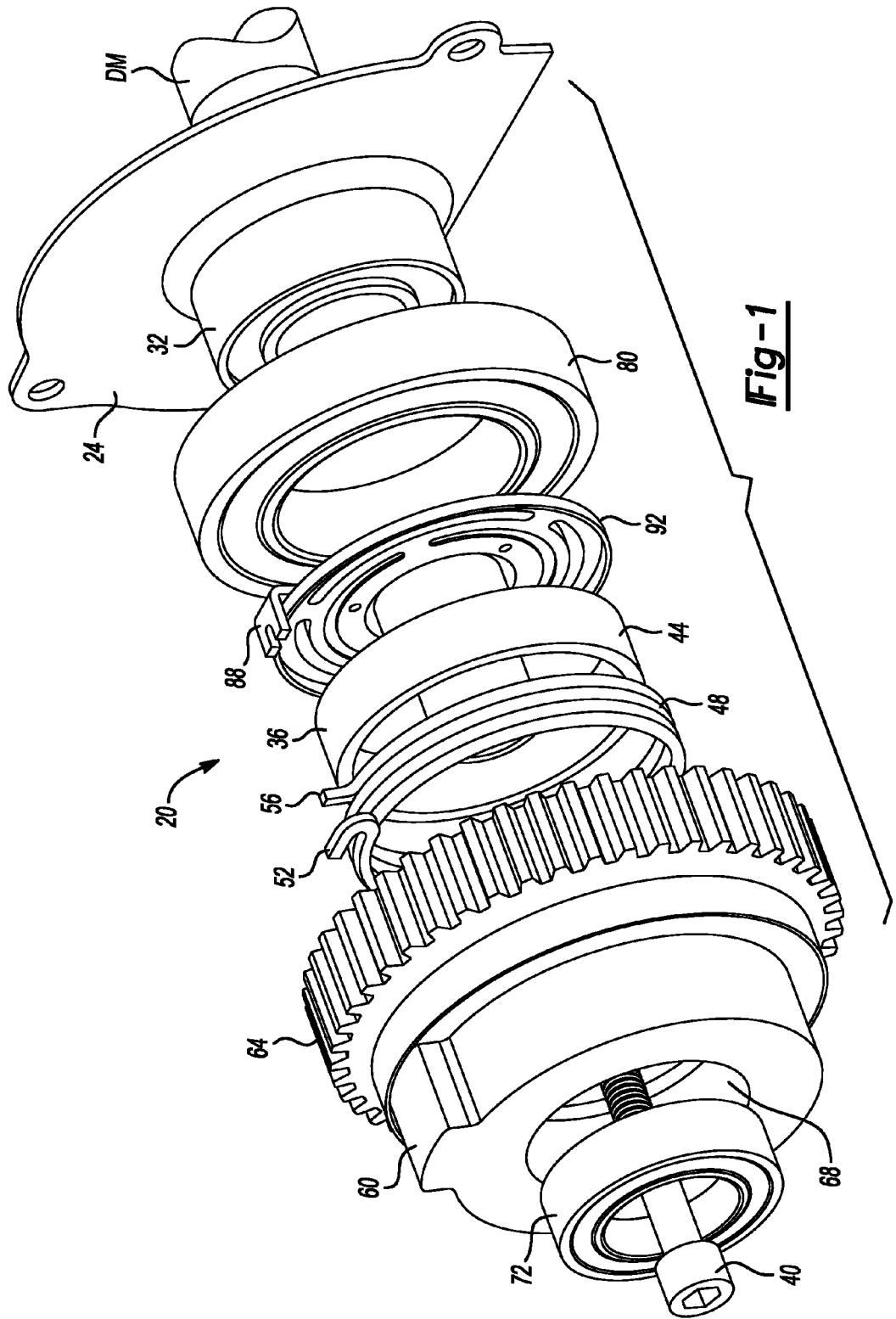
FIG. 1 shows an exploded perspective view of the front and side of a clutch assembly in accordance with the teachings of the present disclosure.
Figure 2:
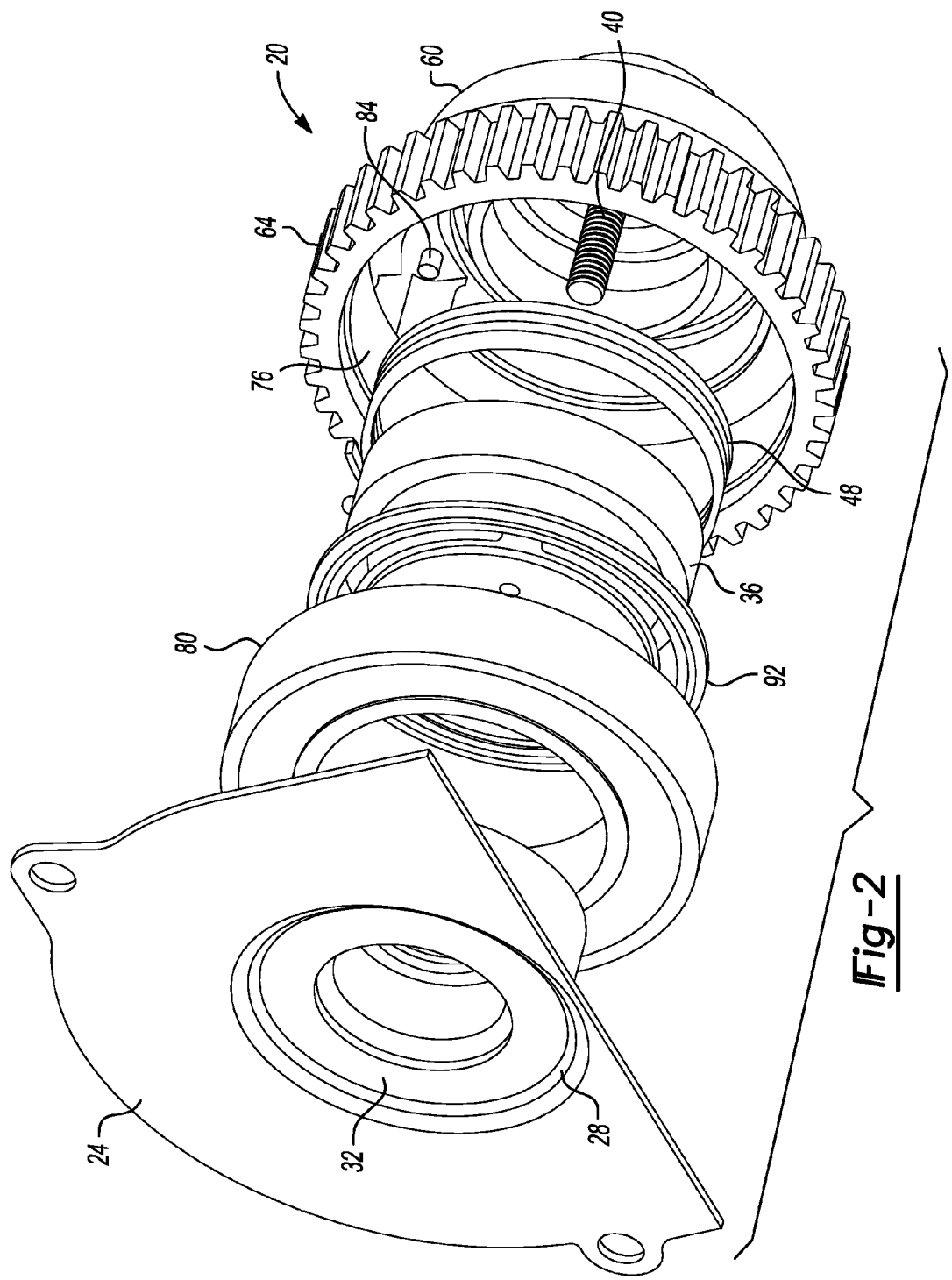
FIG. 2 shows an exploded perspective view of the rear and side of the clutch assembly of FIG. 1.
Figure 3:
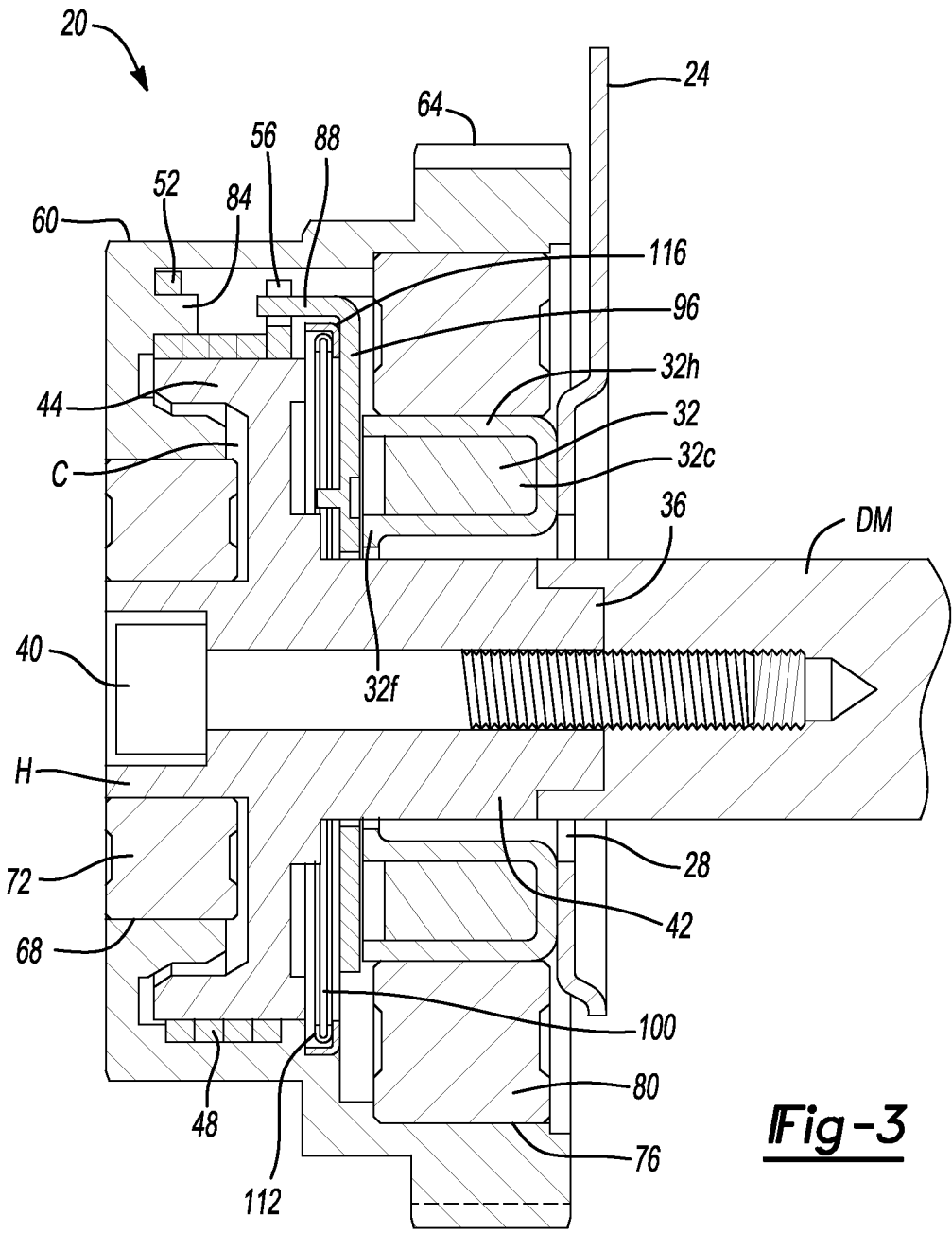
FIG. 3 shows a side cross section of the clutch assembly of FIG. 1.

With reference to FIGS. 1 through 5, a clutch assembly constructed in accordance with the teachings of the present disclosure is generally indicated by reference numeral 20. Clutch assembly 20 can be mounted adjacent to, and coaxially with, a driving member DM, such as a crankshaft, camshaft, idler shaft, jack shaft, counterbalance shaft, etc. of an engine or other device to which clutch assembly 20 is to be connected to receive rotary power therefrom. The driving member DM is configured to rotate in a predetermined rotational direction. In the example of FIG. 1, clutch assembly 20 comprises a mounting plate 24 which can be affixed to the engine to maintain clutch assembly 20 in a desired position relative to the driving member DM.

Mounting plate 24 can include an aperture 28 (best seen in FIG. 3) through which the driving member DM can extend. An actuator, such as an annular electromagnetic coil assembly 32, can be coupled to the mounting plate 24 and disposed concentrically about the aperture 28. Coil assembly 32 can be affixed to mounting plate 24 by any suitable means, such as spot welding, an interference fit into aperture 28, etc. as will occur to those of skill in the art. For clarity, the electrical leads and connections to coil assembly 32 have been omitted from the figures but the selection and arrangement of such electrical leads for coil assembly 32 and their routing will be readily apparent to those of skill in the art. In the example provided, the coil assembly 32 comprises a coil 32c and a coil housing 32h that is fixedly mounted to the mounting plate 24. The coil housing 32h can have a U-shaped cavity into which the coil 32c can be received. The coil housing 32h can also have at least one flange 32f.

A driver 36 can be affixed to the driving member DM by any suitable means, such as one or more threaded fasteners 40. While in the driver 36 in the particular example provided directly abuts the driving member DM, it is contemplated that in some circumstances, for example when it is desired to transfer relatively high levels of torque through clutch assembly 20, that driver 36 can engage the driving member through a splined connection, or a connection with a keyway and key, etc. and other suitable methods for connecting driver 36 and the driving member will be apparent to those of skill in the art.

Driver 36 comprises both a relatively small diameter cylindrical shaft portion 42 (best seen in FIG. 3), which passes through the open center of coil assembly 32 and aperture 28 to connect to the driving member DM, and a relatively large diameter cylindrical output portion having a torque transfer surface 44 as described below. As will now be apparent, driver 36 turns with the driving member DM to which it is affixed and thus torque transfer surface 44 turns with the driving member DM.

Clutch assembly 20 can further comprise a clutch spring 48 that can encircle torque transfer surface 44. Clutch spring 48 can be formed from wire with a square or rectangular cross section, although it is contemplated that wires with other cross sections can be employed in other circumstances. Clutch spring 48 can be wound in a sense or rotational direction that is opposite the predetermined rotational direction. Clutch spring 48 can be wound with an "at rest" (i.e.— without external forces applied to it) diameter which is slightly smaller than the outer diameter of torque transfer surface 44. It will be appreciated, however, that the "at rest" diameter of the clutch spring 48 could be larger in diameter than the torque transmitting surface 44, or that the clutch spring 48 could be formed such that its coils are of two or more different diameters (e.g., stepped in two or more sections, or having one or more tapered sections). As another alternative, one or more of the coils of the clutch spring 48 could be sized with an "at rest" diameter that frictionally engages the torque transmitting surface 44 while a remaining portion of the coils of the clutch spring 48 are sized relatively larger in diameter than the torque transmitting surface 44. Further, one end of clutch spring 48 can have a first control tang, such as a generally hook-shaped drive tang 52, and the other, opposite end of clutch spring 48 can have a second control tang, such as a radially outwardly extending control tang 56.

While clutch spring 48 is illustrated as comprising four complete windings (coils), it will be apparent to those of skill in the art that clutch spring 48 can comprise fewer or greater number of windings depending upon the diameters of clutch spring 48 and torque transfer surface 44, the expected levels of torque to be transferred through clutch assembly 20, the diameter and cross section of the wire from which clutch spring 48 is formed, the materials from which clutch spring 48 and/or torque transfer surface 44 are fabricated, the presence and/or type of lubrication and/or friction coatings applied to clutch spring 48 and/or torque transfer surface 44, the presence of hardening treatments on the relevant components and/or surfaces, and any other factors as will be apparent to those of skill in the art.

Clutch assembly 20 can further comprise an output member 60. The output member 60 can comprise a toothed member that can be configured to engage a toothed belt, a chain, or a gear. It will be appreciated, however, that the output member 60 need not have teeth and as such, could comprise a pulley or roller.

Output member 60 can include a drive portion 64 which will be a suitable configuration and geometry to output rotary power. In the particular example provided, the drive portion 64 has a plurality of teeth that are configured to drivingly engage a toothed belt. It will be appreciated, however, that the drive portion 64 may be configured somewhat differently and as such, may include sprocket teeth, gear teeth, a V or poly-V groove or a cylindrical engagement surface, for example.

Output member 60 can have a cavity C into which the torque transmitting surface 44 can be received. A first bearing bore 68 in the output member 60 can receive a first bearing 72 that can support the output member 60 for rotation relative to a hub H formed on the output portion of the driver 36. A second bearing bore 76 in the output member 60 can receive a second bearing 80 that can support the shaft portion 42 of the output member for rotation relative to the coil housing 32h. Accordingly, it will be appreciated that the output member is capable of independent rotation relative to the driver 36.

Drive tang 52 can engage a first control member on the output member 60. In the example provided, the first control member is a drive pin 84 (best seen in FIGS. 2 and 3) that can be received in generally U-shaped slot defined by the hook-shaped drive tang 52. It will be appreciated that the generally U-shaped slot defined by the hook-shaped drive tang 52 permits limited rotation of the output member 60 relative to the clutch spring 48 in the predetermined rotational direction. It will be appreciated, however, that rotation of the clutch spring 48 in the predetermined rotational direction relative to the output member 60 will drivingly couple the drive tang 52 to the drive pin 84 such that the output member 60 co-rotates with the drive tang 52.

Figure 4:
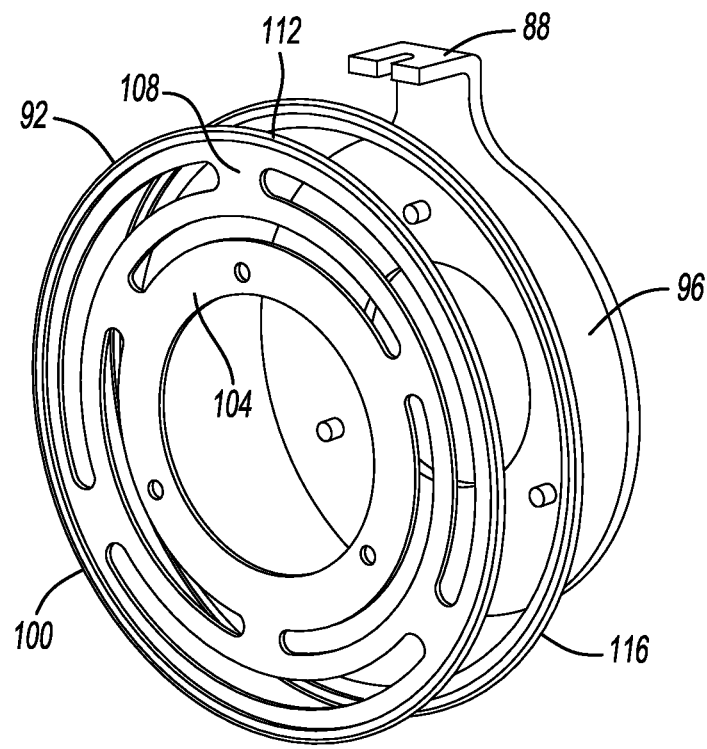
FIG. 4 shows an exploded perspective view of an armature assembly of the clutch assembly of FIG. 1.

The control tang 56 can be received in a second control member that can be coupled for rotation with an armature 92 as is best seen in FIG. 4. The second control member can be a control fork 88 having arms between which the control tang 56 can be received. Armature 92 can comprise an armature plate 96 and a return spring 100. Armature plate 96 can be fabricated from an electromagnetic material, such as steel.

Return spring 100 can include a radial inner portion 104, which can be affixed to armature plate 96 by any suitable means, such as staking or riveting, etc., and a radial outer portion 104 that can include about its radial outer periphery an overmolding, or applied coating, of a friction reducing material 112 such as PTFE or an engineering nylon. The friction reducing material 112 can permit armature 92 to move rotationally to at least a limited extent with respect to output member 60, as will be described in more detail below. Return spring 100 can be formed of a spring steel, or other suitable material, and can bias armature plate 96 in a predetermined axial direction, such as away from coil assembly 32 as will be discussed in further detail below.

A seal ring 116 can surround return spring 100 and can be received into the cavity C of output member 60. The seal ring 116 can engage the output member 60 in a press-fit manner and can aid in maintaining armature assembly 92 in place, as well as to assist in preventing migration of a lubricant (if any) between clutch spring 48 and torque transfer surface 44 to other parts of clutch assembly 20, such as a surface of the coil assembly 32.

In the example of FIGS. 1 through 5, clutch assembly 20 is operable in an engaged condition and a disengaged condition. Operation of the clutch assembly 20 in the engaged condition permits rotary power to be transmitted through the clutch assembly 20 in the predetermined rotational direction (e.g., counter-clockwise in FIG. 1) when the driving member DM is rotated in the predetermined rotational direction, while operation of the clutch assembly 20 in the disengaged condition inhibits the transmission of rotary power through the clutch assembly 20 in the predetermined rotational direction when the driving member DM is rotated in the predetermined rotational direction. It will be appreciated that when the clutch assembly 20 is operated in the disengaged condition, transmission of rotary power transmitted in the predetermined rotational direction between the first control tang and the first control member will be limited. In some configurations, the clutch assembly 20 can be configured to completely interrupt the transmission of rotary power in the predetermined rotational direction, while in other configurations, the clutch assembly 20 may limit the transmission of rotary power in the predetermined rotational direction to a nominal value that is below a predetermined torsional value.

Figure 5:
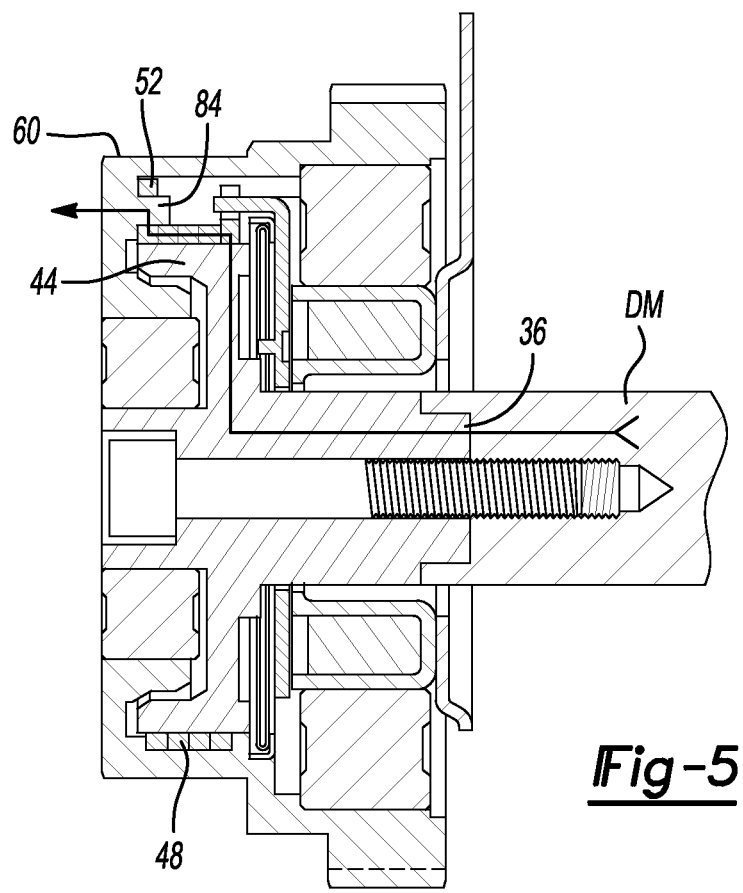
FIG. 5 shows a similar cross section to that of FIG. 3 but wherein the path of torque transfer through the engaged clutch assembly is indicated.

With reference to FIG. 5, a torque path through the clutch assembly 20 when the clutch assembly 20 is operated in the engaged condition is depicted by the arrow drawn in heavy line through clutch assembly 20. Rotation of the driving member DM will cause corresponding rotation of the driver 36 and that corresponding rotation of the torque transfer surface 44 will cause the clutch spring 48 to tend to rotate with the driver 36. The actuator (i.e., coil assembly 32 in the example provided) is operated in an engaging mode in which the coil 32c is not powered and does not generate a magnetic field. Accordingly, the return spring 100 biases the armature 92 away from the coil assembly 32 so that the armature plate 96 does not contact the flange 32f of the coil housing 32h to thereby permit the armature 92 to rotate with the clutch spring 48 in a virtually unimpeded manner. Contact between the first control tang (e.g., drive tang 52) and the first control member (e.g., drive pin 84) will cause output member 60 to tend to rotate with the clutch spring 48. As the output member 60 is drivingly coupled to other devices (e.g., a belt drive in the example provided), the rotary load on the output member 60 will resist rotation in the predetermined rotational direction, causing the coils of the clutch spring 48 to coil more tightly into engagement with the torque transmitting surface 44 to effectively lock the coils of the clutch spring 48 to the torque transfer surface 44 and thereby facilitate the transmission of rotary power from torque transfer surface 44 to clutch spring 48 and then from the drive tang 52 to the drive pin 84. Thus, torque or rotary power is transferred from the driving member DM, through torque transfer surface 44 of driver 36 and clutch spring 48 to output member 60 and, from there, drive portion 64 can operate the belt, chain, gear train or any other suitable drive means to provide the torque to the accessory device to be driven.

Operation of the clutch assembly 20 in the disengaged condition entails the operation of the actuator (e.g., coil assembly 32 in the example provided) in a disengaging condition while the drive member DM rotates the driver 36. Operation of the coil assembly 32 in the disengaging condition entails providing electrical power to the coil 32c to cause the coil 32c to generate a magnetic field that translates the armature 92 in an axial direction against the bias of the return spring 100 such that the armature 92 frictionally engages another member of the clutch assembly 20, such as the coil housing 32h. Frictional engagement between the armature 92 and the coil housing 32h slows the rotation of the armature 92 relative to the coils of the clutch spring 48 (which tend to rotate with the torque transmitting surface 44 of the driver 36) so that the armature 92, the second control member (e.g., control fork 88) and the second control tang (e.g., control tang 56) rotate relative to the drive member 36 in a direction opposite the predetermined rotational direction. Relative rotation in this manner causes the coils of the clutch spring 48 to tend to uncoil from the torque transmitting surface 44 to halt or limit the rotary power that is input to the clutch spring 48 from the torque transmitting surface 44 of the driver 36. Due to the rotary load on the output member 60, the rotary power transmitted between the torque transmitting surface 44 and the coils of the clutch spring 48 may be insufficient to further drive the output member 60 despite continued rotation of the driving member DM. It will be appreciated, however, that rotation of the output member 60 may not be instantaneous with the uncoiling of the clutch spring 48, depending upon the inertia, friction and load of the drive means and accessory device to which it is connected, while the driving member can continue to rotate.

As will be apparent to those of skill in the art, the rotation of control fork 88 and resulting movement of control tang 56 which disengages clutch assembly 20 can be quite small, typically less than ten degrees, which allows for a relatively rapid disengagement of clutch assembly 20. In situations where a friction material is employed to control the engagement of the armature 92 with another structure (e.g., the flange 32f of the coil housing 32h in the example provided), it will be appreciated that the friction material (e.g., friction material 112) can help to limit wear of the clutch assembly 20.

When it is desired to re-engage clutch assembly 20, coil assembly 32 can be operated in the engaging condition (i.e., coil 32c is de-energized) to permit return spring 100 to move armature plate 96 away from, and out of contact with, coil housing 32h. With the frictional force now no longer acting on armature plate 96, armature plate 96 and control tang 88 are biased in the predetermined rotational direction relative to the output member 60 (due to the torsional characteristics of the clutch spring 48), which permits the coils of the clutch spring 48 to contract about the torque transfer surface 44. As the windings of clutch spring 48 again lock to torque transfer surface 44, torque is again transferred from torque transfer surface 44 of driver 36 to output member 60, as described above.

As will be apparent to those of skill in the art, clutch assembly 20 is not limited to use with driving members and output members which are intended to transfer torque in a counter clockwise sense and clutch assembly 20 can be easily modified for use with driving members rotating in a clockwise sense by reversing the winding direction of clutch spring 48, changing the direction of the hook in drive tang 52, etc.

As will also be apparent, in the illustrated embodiment clutch assembly 20 will "fail safe" in that a loss of electrical power to the coil assembly 32 such that clutch assembly 20 will remain in or return to the engaged condition so that rotary power will be transmitted from the driving member to output member 60.

Figure 6:
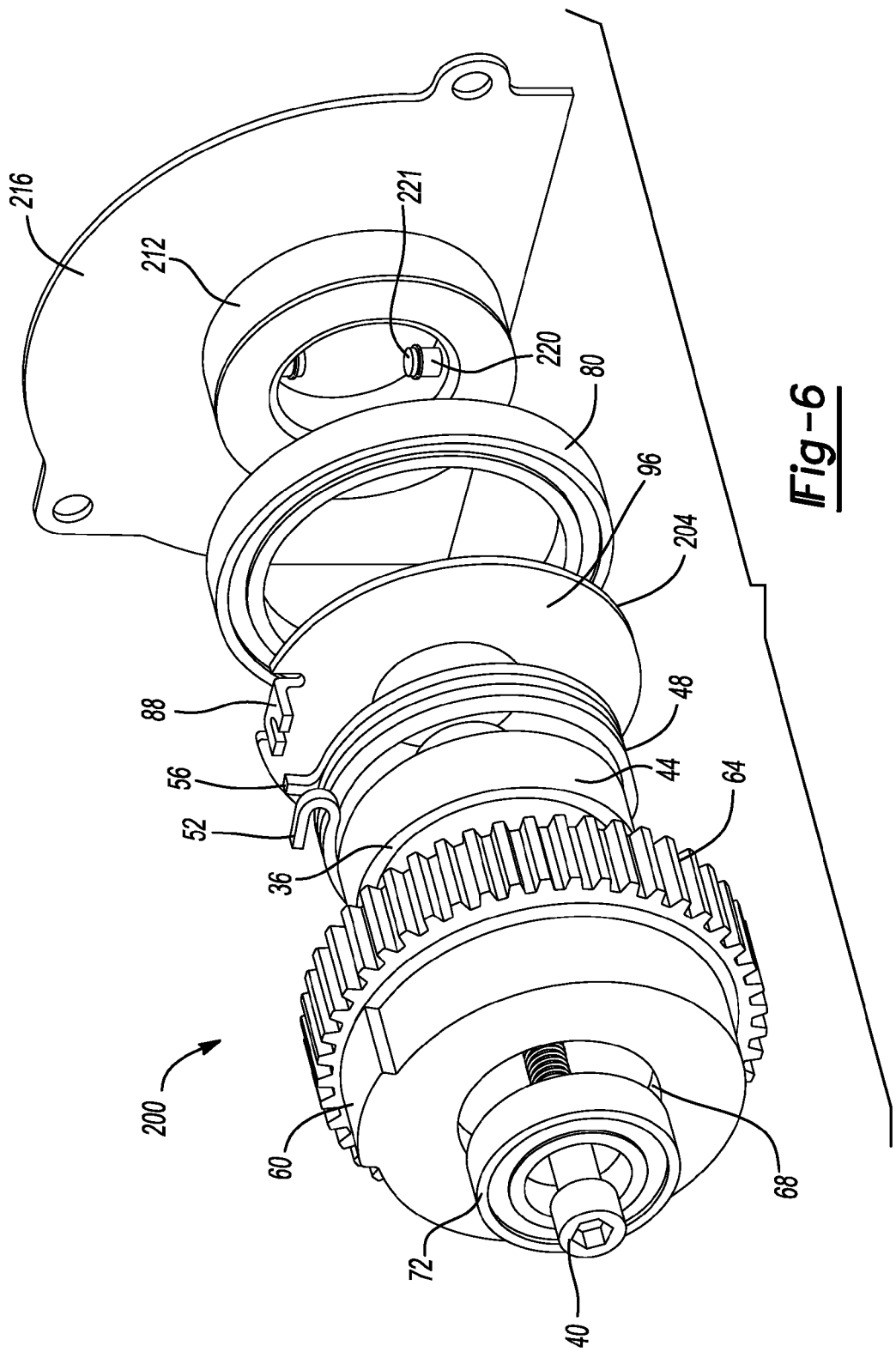
FIG. 6 shows an exploded perspective view of the front and side of another clutch assembly constructed in accordance with the teachings of the present disclosure.
Figure 7:
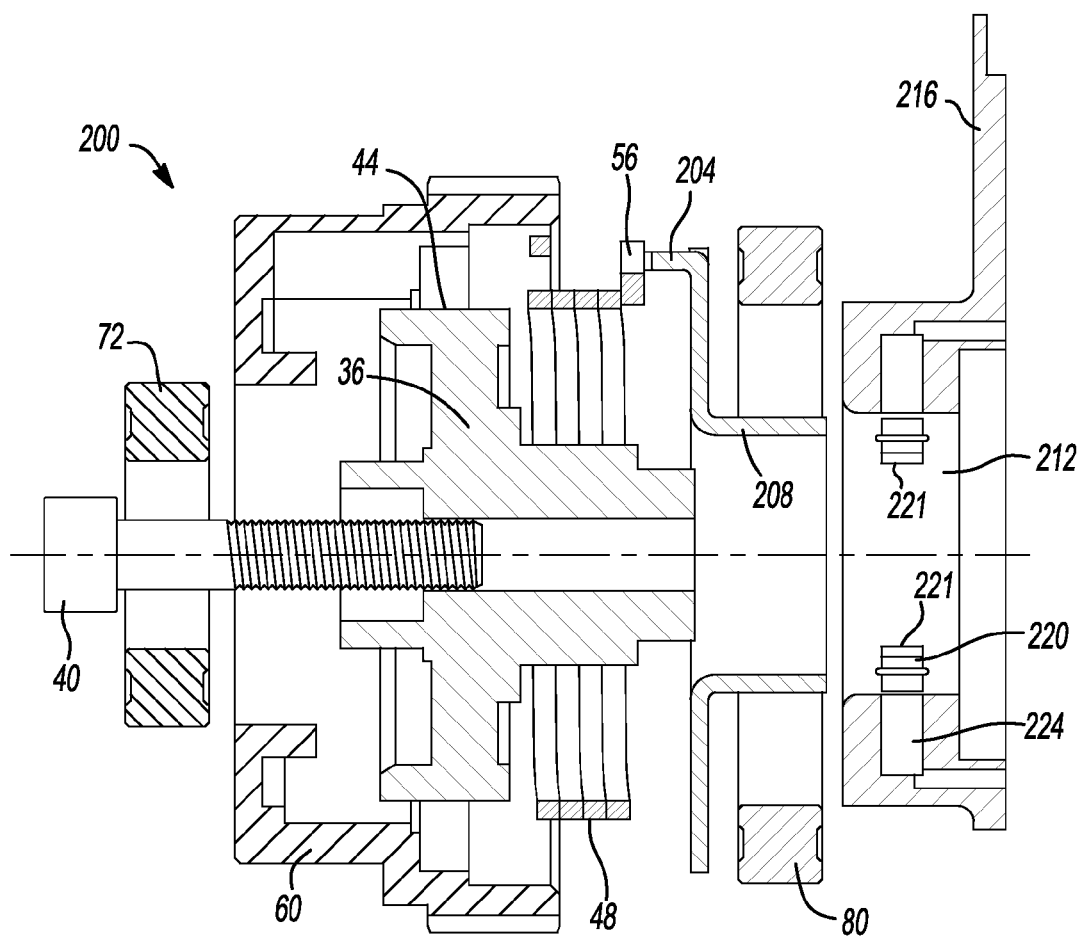
FIG. 7 shows a partially exploded cross section view of the clutch assembly of FIG. 6.
Figure 8:
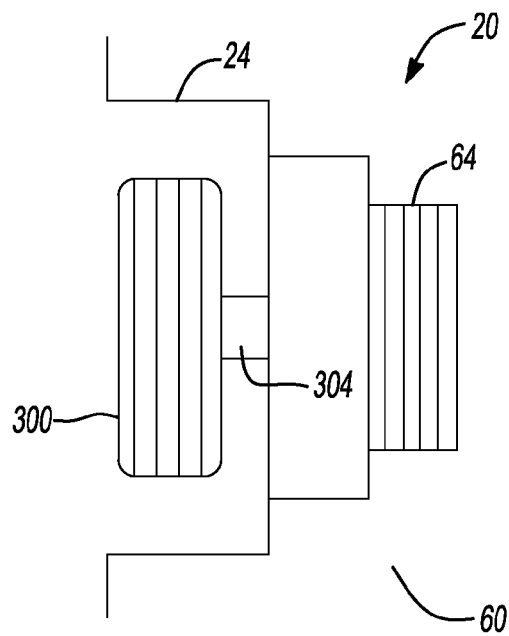
FIG. 8 shows the clutch assembly of FIG. 1 in a configuration for indirect connection to a driving member.

A second exemplary clutch assembly constructed in accordance with the teachings of the present disclosure is generally indicated by reference numeral 200 in FIGS. 6 and 7, wherein like components to those of the example of FIGS. 1-5 discussed above are indicated with like reference numerals.

In clutch assembly 200, an armature 204 replaces the armature assembly 92 (FIG. 1) of the previous example. Armature 204 can include a control fork 88 and an annular braking collar 208. The annular braking collar 208 can extend from the armature plate 96 in an axial direction away from output member 60.

Braking collar 208 can be received in an annular brake chamber 212 on mounting plate 216. As was the case with mounting plate 24 (FIG. 1) of the previous example, mounting plate 216 can be affixed to the engine, or other driving device, to maintain clutch assembly 200 in a desired position.

One or more brake shoes 221 can be received an associated bores 224 that extend into brake chamber 212. The brake shoes 221 can be configured to engage the annular braking collar 208 to generate a frictional force that can be employed to slow the rotation of the armature 204. In the particular example provided, the brake shoes 221 are coupled to pistons 220, and the bores 224 are fluid conduits that are suited to communicate fluid pressure (e.g., hydraulic, pneumatic) to the pistons 220. If desired, springs could be employed to urge the pistons 220 (and the brake shoes 221) in a direction away from the annular braking collar 208 (i.e., in a radially outward direction relative to the brake chamber 212.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clutched apparatus comprising:
a driver having a cylindrical torque transfer surface, the driver being adapted to be coupled to a source of rotary power to cause the driver to be rotated in a predetermined rotational direction;
an output member capable of independent rotation relative to the driver, the output member having a first control member;
a clutch spring formed of wire and having coils wound in a sense that is opposite to the predetermined rotational direction of the driver, the clutch spring having a first end and a second end that is opposite the first end, the first and second ends being coupled to opposite ends of the coils, all of the coils being engaged to the cylindrical torque transfer surface, the first end comprises a hook that is received about the first control member;
a spring control device comprising a second control member, which is coupled to the second end, and an armature; and
an actuator that is operable in a disengaging mode and an engaging mode, wherein a force is generated when the actuator is operated in the disengaging mode, the force being transmitted to the armature such that the armature rotates relative to the driver in a rotational direction opposite the predetermined rotational direction to apply a control signal to the second end;
wherein rotation of the driver in the predetermined direction when the actuator is operated in the engaging mode causes the coils of the clutch spring to wrap down and drivingly engage the cylindrical torque transfer surface such that rotary power is transmitted in the predetermined rotational direction between the first end and the first control member; and
wherein the coils of the clutch spring at least partly release the cylindrical torque transfer surface when the driver is rotated in the predetermined rotational direction and the actuator is operated in the disengaging mode to limit transmission of rotary power in the predetermined rotational direction between the first end and the first control member.

2. The clutched apparatus of claim 1, wherein the actuator comprises an electromagnetic coil assembly and a return spring for biasing the armature in a predetermined axial direction relative to the electromagnetic coil assembly.

3. The clutched apparatus of claim 2, wherein the armature frictionally engages the electromagnetic coil assembly when the actuator is operated in the disengaging mode.

4. The clutched apparatus of claim 3, wherein the electromagnetic coil assembly comprises a coil and a coil housing, and wherein the coil housing comprises at least one flange that is configured to abut the armature when the armature frictionally engages the electromagnetic coil assembly.

5. The clutched apparatus of claim 3, wherein at least one of the armature and the electromagnetic coil assembly comprises a friction material.

6. The clutched apparatus of claim 1, wherein the hook is generally U-shaped and is oriented to permit rotation of the output member in the predetermined rotational direction relative to the hook.

7. The clutched apparatus of claim 1, wherein the second control member is a fork into which the second end is received.

8. The clutched apparatus of claim 1, wherein the second end extends from an adjacent one of the coils of the clutch spring in a radially outward direction.

9. The clutched apparatus of claim 1, wherein the coils have an at rest diameter that is smaller than a diameter of the cylindrical torque transfer surface.

10. The clutched apparatus of claim 1, wherein the coils are formed to a substantially constant diameter.

11. The clutched apparatus of claim 1, wherein the output member is a sprocket, a gear or a pulley.

12. The clutched apparatus of claim 1, wherein the actuator comprises a shoe that is driven into contact with the armature when the actuator is operated in the disengaging mode.

13. The clutched apparatus of claim 12, wherein the shoe is movable in response to application of fluid pressure to a piston.

14. The clutched apparatus of claim 13, further comprising a mounting plate that houses the piston and the shoe, wherein the mounting plate comprises a conduit in fluid communication with the piston.

15. A clutched apparatus comprising:
  a driver having a cylindrical torque transfer surface, the driver being adapted to be coupled to a source of rotary power to cause the driver to be rotated in a predetermined rotational direction;
  an output member capable of independent rotation relative to the driver, the output member having a first control member;
  a clutch spring formed of wire and having coils wound in a sense that is opposite to the predetermined rotational direction of the driver, the clutch spring having a first end and a second end that is opposite the first end, the coils being engaged to the cylindrical torque transfer surface;
  a spring control device comprising a second control member, which is coupled to the second end, and an armature; and
  an actuator that is operable in a disengaging mode and an engaging mode, wherein a force is generated when the actuator is operated in the disengaging mode, the force being transmitted to the armature such that the armature rotates relative to the driver in a rotational direction opposite the predetermined rotational direction to apply a control signal to the second end;
  wherein rotation of the driver in the predetermined direction when the actuator is operated in the engaging mode causes the coils of the clutch spring to drivingly engage the cylindrical torque transfer surface such that rotary power is transmitted in the predetermined rotational direction between the first end and the first control member;
  wherein the coils of the clutch spring at least partly release the cylindrical torque transfer surface when the driver is rotated in the predetermined rotational direction and the actuator is operated in the disengaging mode to limit transmission of rotary power in the predetermined rotational direction between the first end and the first control member; and
  wherein the actuator comprises a shoe that is driven into contact with the armature when the actuator is operated in the disengaging mode.

16. The clutched apparatus of claim 15, wherein the shoe is movable in response to application of fluid pressure to a piston.

17. The clutched apparatus of claim 16, further comprising a mounting plate that houses the piston and the shoe, wherein the mounting plate comprises a conduit in fluid communication with the piston.

18. A clutched apparatus comprising:
  a driving member;
  an output member;
  a driver coupled to the driving member for rotation therewith;
  a clutch spring having a first end, a second end and a plurality of coils between the first and second ends, the first end being hook-shaped and engaged to the output member, the first and second ends being coupled to opposite ends of the coils, all of the coils being engageable to a torque transfer surface to rotationally couple the output member to the driver, the torque transfer surface being an outer circumferential surface onto which the coils of the clutch spring are wound onto; and
  an actuator that is operable for causing the clutched apparatus to operate in a disengaged condition, the actuator comprising a coil, a return spring and an armature, the armature being coupled to the second end of the clutch spring for rotation therewith, the return spring biasing the armature in a first direction, the coil being configured to translate the armature against the bias of the return spring so that a frictional torque that resists rotation of the armature to cause the coils of the clutch spring to at least partially disengage the torque transfer surface.

19. The clutched apparatus of claim 18, wherein the driving member comprises a crankshaft, a camshaft, an idler shaft, a jack shaft and/or a counterbalance shaft.

20. The clutched apparatus of claim 18, wherein the return spring is integrally and unitarily formed with the armature.

21. The clutched apparatus of claim 18, wherein the output member comprises a drive portion having a plurality of teeth.

22. The clutched apparatus of claim 18, wherein the armature is configured to frictionally engage a housing of the coil when the actuator operates the clutched apparatus in the disengaged condition.

23. The clutched apparatus of claim 18, wherein the armature comprises a control fork into which the second end of the clutch spring is received.

* * * * *